(12) United States Patent
Kumar (10) Patent No.: US 7,514,962 B2
(45) Date of Patent: Apr. 7, 2009

(54) CONFIGURABLE I2C INTERFACE (75) Inventor: Vinod Kumar, Uttar Pradesh (IN)

(73) Assignee: STMicroelectronics Pvt. Ltd., Uttar Pradesh (IN)

( * ) Notice: Subject to any disclaimer, the term of this patent is extended or adjusted under 35 U.S.C. 154(b) by 0 days.

(21) Appl. No.: 11/741,565

(22) Filed: Apr. 27, 2007

(65) Prior Publication Data

US 2008/0034134 A1 Feb. 7, 2008

(30) Foreign Application Priority Data

Apr. 28, 2006 (IN) .................... 1094/DEL/2006

(51) Int. Cl.
*H03K 19/0175* (2006.01)
(52) U.S. Cl. .................... 326/82; 710/305; 327/109
(58) Field of Classification Search ............... 326/68, 326/83, 86, 87; 327/108, 109, 333; 710/61, 710/110, 305
See application file for complete search history.

(56) References Cited

U.S. PATENT DOCUMENTS

2002/0091887 A1* 7/2002 Reay et al. .................. 710/300
2003/0107909 A1* 6/2003 Nakamura ................... 365/63
2006/0290381 A1* 12/2006 Bui et al. ..................... 326/91
2007/0247192 A1* 10/2007 Miyazaki .................... 326/83
2008/0018486 A1* 1/2008 Terasawa ................. 340/636.1

* cited by examiner

*Primary Examiner*—Rexford Barnie
*Assistant Examiner*—Jany Tran
(74) *Attorney, Agent, or Firm*—Lisa K. Jorgenson; E. Russell Tarleton; Seed IP Law Group PLLC (57) ABSTRACT

A synchronous serial data two-wire communications bus that can transfer data at rates up to 100 kbit/s (standard mode), 400 kbits/s (fast mode), or 3.4 Mbit/s (high-speed mode). The load of I2C bus can vary from 10 pf to 400 pf. Data transfer on the I2C bus takes place through IO's used to connect the devices on the I2C bus utilizing two different IO buffers for DATA and CLOCK lines that can be switched into any of the three different modes of operation without using any external current source or external control circuit. IO buffers are provided with two additional pins ENHS and HLOAD to switch the IO buffers in different modes of operation. Both DATA and CLOCK buffers have built-in current sources, and their control circuits control the rise and fall time of I2C bus in different modes of operation.

22 Claims, 7 Drawing Sheets

FIGURE 1

(Prior Art)

FIGURE 2

(Prior Art)

FIGURE 7 ns (fast mode). Also a no-filter path is provided for standard mode operation. An inbuilt multiplexer circuit is used for selecting the required path according to the desired data transfer rate.

CONFIGURABLE I2C INTERFACE

BACKGROUND

1. Technical Field

The present disclosure relates to a configurable I2C interface and, more particularly, to the input/output buffers of devices connected on the I2C bus, which can switch in three different modes of operation (Standard/Fast/High-Speed).

2. Description of the Related Art

The I2C bus is a two-wire communication bus that is used for synchronous serial data transfer. The I2C bus can transfer data at rates up to 100 kbit/s (standard mode), 400 kbit/s (fast mode), or 3.4 Mbit/s (high-speed mode). The load on the I2C bus can also vary from 10 pf to 400 pf. In standard and fast mode it is easy to achieve the required data rate without altering the system design. However, when the I2C bus switches into high-speed mode, the IO's used for the standard and fast mode fail to achieve the required data rate. It therefore becomes necessary to provide additional circuitry to enable the IO's to achieve the required data rate.

The available literature describes a technique for achieving the high speed data rate using an internal current source when the load on the bus is up to 100 pf, and using a combination of internal and external current sources when the load on the I2C bus is more than 100 pf. This technique is useful when the load on the I2C bus and its mode of operation (data rate) is fixed.

Figure 1:
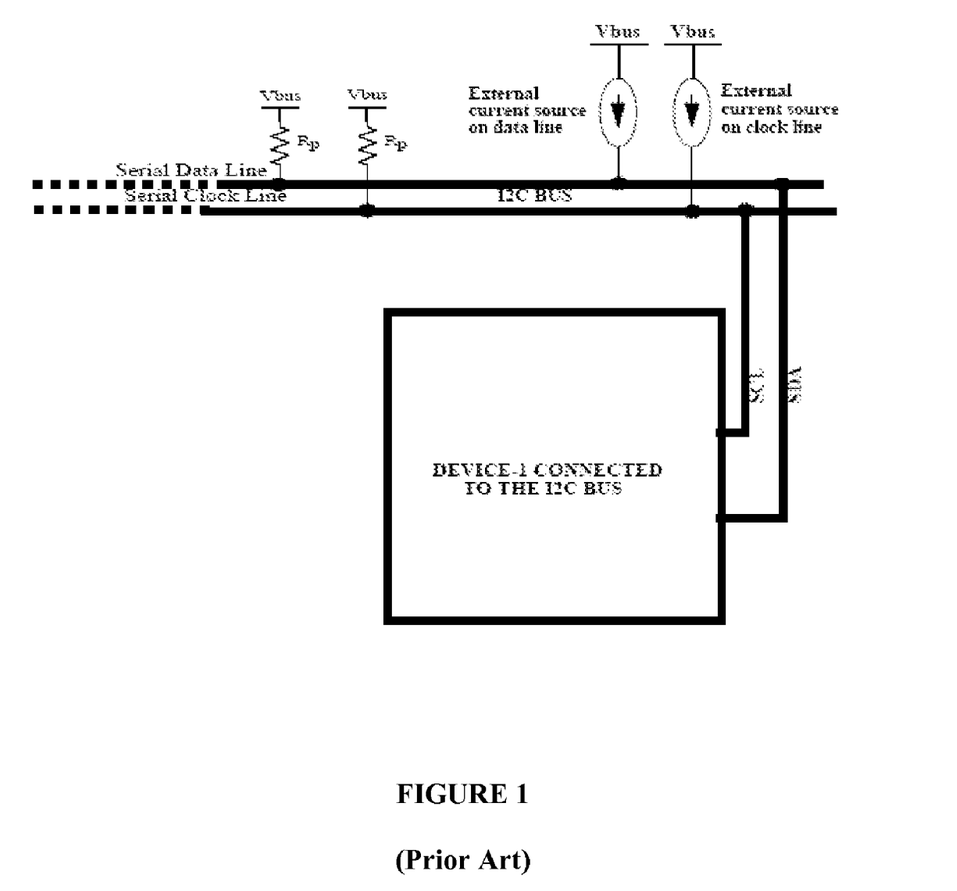
FIG. 1 shows I2C system level architecture according to the prior design, when the I2C bus is in high speed mode and the load on the bus is higher than 100 pf.

FIG. 1 shows the system level architecture of an implementation of an I2C driver implemented according to a prior design when the bus is operating in high speed mode and the load on the bus is higher than 100 pf. Here, an external current source is connected to a serial data line and a serial clock line each. These external current sources help to achieve the required rise and fall times of the I2C bus. However, when the load on the I2C bus becomes less than 100 pf, these external current sources must be removed. This arrangement complicates the switching of the bus from one mode to another.

Figure 2:
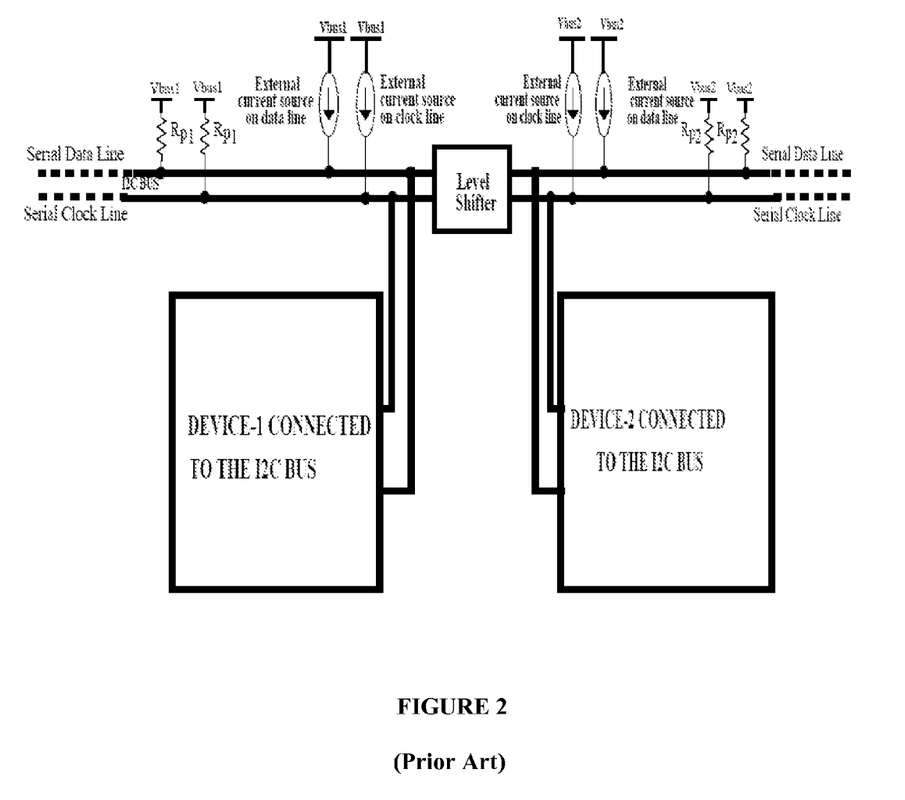
FIG. 2 shows the operation of the I2C system according to the prior design when using two different bus voltages, when the I2C bus is in high speed mode and the load on the bus is higher than 100 pf.

FIG. 2 shows the structure of an I2C system according to another prior design (when the bus is in a high speed mode and the load on the I2C bus is higher than 100 pf) when operating with two different bus supply voltages. Each time the supply voltage on the I2C bus changes, additional current sources on the I2C bus must be connected for achieving the required data rate. This requirement makes the design of the I2C system very complex.

BRIEF SUMMARY

The disclosed embodiments are directed to I2C buffers that make the I2C bus programmable, so that the I2C bus can switch from one mode to other mode without using any external current source.

Another aspect of the present disclosure is simplification of the implementation of I2C systems that operate at different bus supply voltages.

To achieve the foregoing advantages, the present disclosure describes two separate IO buffers, one for the serial data line (DATA BUFFER) and the other for the serial clock line (CLOCK BUFFER). The DATA BUFFER contains a built-in current-source and a corresponding control circuit. The built-in current source improves the rising and falling edges of the serial data line when the I2C bus switches in high speed mode and the load on the bus is higher than 100 pf.

The CLOCK BUFFER contains two built-in current sources and a corresponding control circuit. One current source is used to improve only the rising edge of the serial clock line when the I2C bus is in high speed mode, whereas the other current source improves the rising as well as the falling edges of serial clock line when the I2C bus is in high speed mode and the load on the I2C bus is greater than 100 pf.

The input buffer of both the DATA and the CLOCK lines contain two built-in filter circuits, one for filtering spikes of $<=10$ ns (high speed) and the other for filtering spikes of $<=50$ ns (fast mode). Also a no-filter path is provided for standard mode operation. An inbuilt multiplexer circuit is used for selecting the required path according to the desired data transfer rate.

To achieve the foregoing, the present disclosure provides a configurable I2C interface that includes a clock input buffer; a data input buffer; a clock output buffer having a first configurable drive current source; a data output buffer having a second configurable drive current source; a first control circuit having a select input and output connected to the control input of said first configurable drive current source; and a second control circuit having a select input and output connected to the control input of said second configurable drive current source. The said first configurable drive current source includes a first switch-able current source and a second switch-able current source.

The said second configurable drive current source includes a single switch-able current source.

The said first control circuit enables said first switch-able current source of the said first configurable drive current source during the rising-edge of the clock during high-speed I2C mode.

The said first control circuit enables said second switch-able current source of the said first configurable drive current source for both the rising-edge and falling-edge of the clock during high-speed I2C mode when the load capacitance is greater than 100 pf.

The said second control circuit enables said switch-able current source of the said second configurable drive current source for both the rising-edge and falling-edge of the serial data line during high-speed I2C mode when the load capacitance is greater than 100 pf.

The said clock input buffer and said data input buffer includes selectable input filters for fast and high-speed mode of operation.

The said selectable input filter include a filter for pulses less than or equal to 50 nsec width during fast mode of operation.

The said selectable input filters include a filter for pulses less than or equal to 10 nsec width during high-speed mode of operation.

The said input filters are selected by means of an input signal multiplexer.

The present disclosure also provides a method for improving the performance of a I2C interface that includes the steps of: providing a clock output buffer with configurable current drive; providing a data output buffer with configurable current drive; sensing the desired mode of operation; sensing the value of the capacitive loading on the clock line and the data line; and selecting the current drive levels of the clock output buffer and the data output buffer based on the desired operating mode as well the sensed capacitive loading.

The current drive for the clock output buffer is configurable for one of three current levels.

The current drive for the data output buffer is configurable for one of two current levels.

The three current drive levels for the clock output buffer are configurable by either enabling a first current source having a first current value or enabling a second current having a second current value or enabling both first and second current sources simultaneously.

The above method also includes the step of filtering the input signals on the data input and clock input buffers.

The filtering comprises the steps of: enabling a first input filter during fast mode of operation; and enabling a second input filter during high-speed mode of operation.

The first input filter is configured to filter pulses of width less than or equal to 50 nsec, while said second filter is configured to filter pulses of width less than or equal to 10 nsec.

BRIEF DESCRIPTION OF THE SEVERAL VIEWS OF THE DRAWINGS

The present disclosure will now be described in detail with reference to the accompanying drawings, in which.

DETAILED DESCRIPTION

Figure 3:
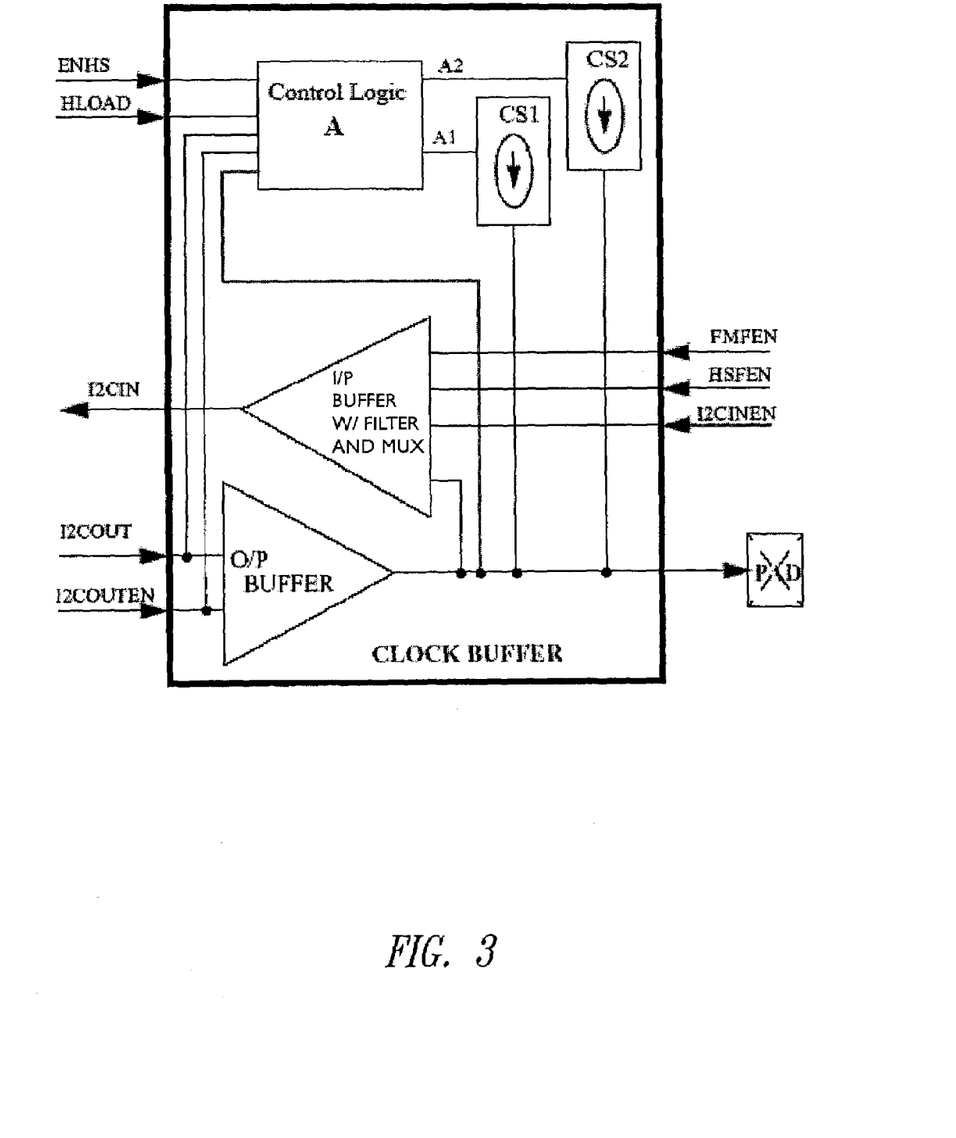
FIG. 3 shows the block diagram of the IO buffer for the serial clock line according to the present disclosure.

FIG. 3 shows the block diagram of an input/output buffer according to the present disclosure, used on the serial clock line (SCL). The I2CINEN pin of the clock buffer is used to enable/disable the input buffer of the clock line. When the I2CINEN pin is high, the input buffer is enabled and when the I2CINEN pin is low, the input buffer is disabled. When the clock buffer is in input mode, the signal at node PAD can propagate to the node I2CIN through three different paths, depending on the mode of operation. In Standard mode the path with no filter is activated. In Fast mode the path with a 50 ns filter is activated. In high-speed mode the path with a 10 ns filter is activated.

The pins HSFEN and FMFEN of the CLOCK buffer are used to select the appropriate path through which the signal at PAD will propagate to the I2CIN pin. When both HSFEN and FMFEN are low, the path with no filter is selected. When the Pin FMFEN is high and HSFEN is low, the path with the 50 ns filter is selected. When the FMFEN is low and HSFEN is high, the path with the 10 ns filter is selected. When the bus switches from one mode to the other mode, the values of the HSFEN and FMFEN pins are to be changed correspondingly in order to select the appropriate path.

The pin I2COUTEN of the clock IO buffer is used to enable/disable the output buffer of the clock IO buffer. When the I2COUTEN pin is low, the output buffer gets enabled, and when the I2COUTEN pin is high the output buffer gets disabled. The ENHS pin represents the mode of the I2C bus. When the bus is in standard/fast mode, pin ENHS is set to low and when the bus switches to high-speed mode, pin ENHS is set to high The HLOAD pin represents the load on the I2C bus. When the load on the I2C bus is 10 pf to 100 pf, the HLOAD pin is set to low, and when the load on I2C bus becomes more than 100 pf, HLOAD is set to high.

Current sources CS1 and CS2 are used to control the risetime of the I2C bus. The current source CS1 is controlled by control signal A1 and current source CS2 is controlled by control signal A2. Both control signals A1 and A2 are generated by a control logic block A. Control logic block A generates the control signal A1 and A2 by using ENHS, HLOAD, I2COUTEN, I2COUT and PAD as inputs. Control signal A1 is generated in such a way that it enables the current source CS1 only when the I2C bus is in high-speed mode and the load on the I2C bus is more than 100 pf. In all other states the control signal A1 keeps the current source CS1 off. Control signal A2 is generated in such a way that it enables current source CS2 only during the rising of the serial clock line when the I2C bus is in high speed mode, and it disables the current source CS2 in the other states. The use of CS1 and CS2 reduces the rise time of the clock line and hence increases the data rate of bus so that it can achieve the data transfer rate of 3.4 Mbits/sec in high speed mode. The current source CS2 will have no impact on the fall time of serial clock line, but the use of current source CS1 increases the fall time of the serial clock line when it is enabled.

Figure 4:
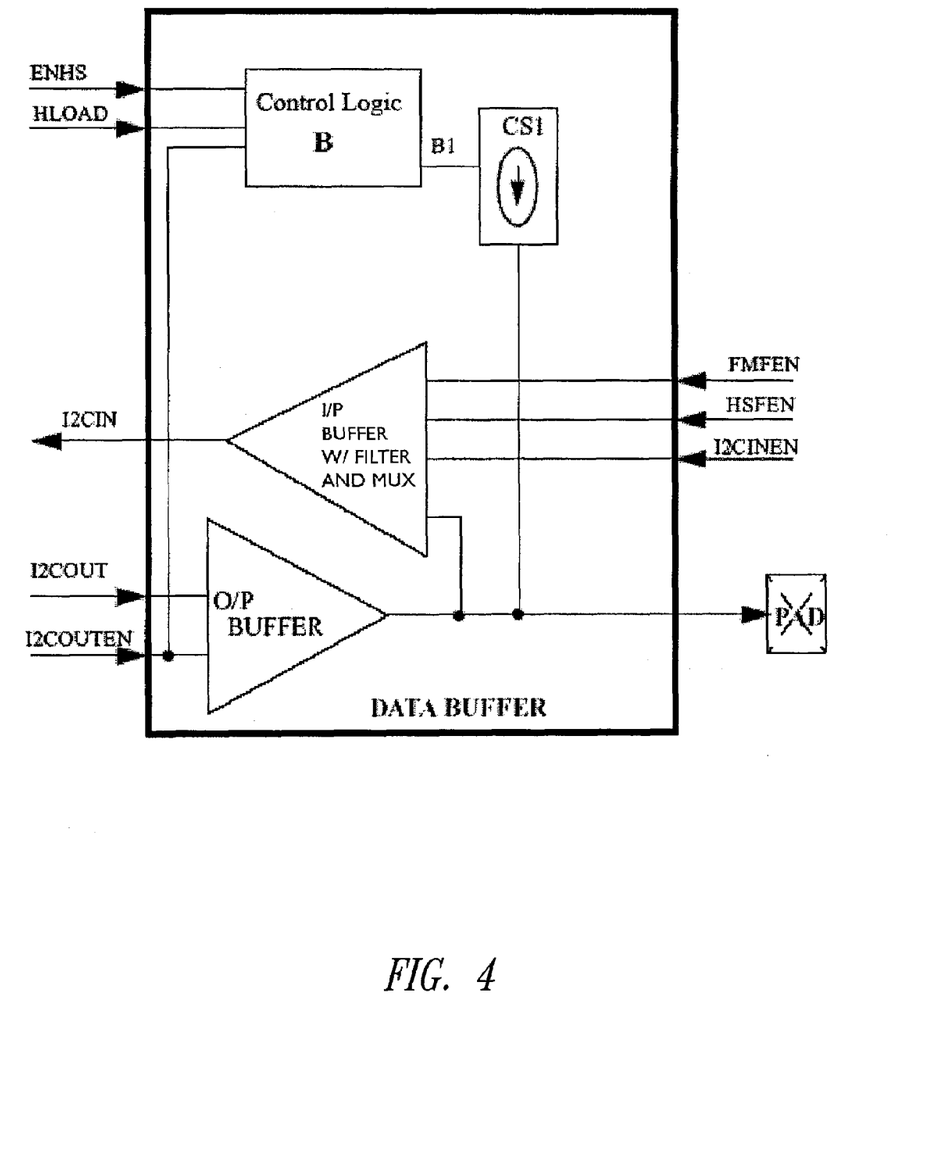
FIG. 4 shows the block diagram of the IO buffer for the serial data line according to the present disclosure.

FIG. 4 shows the block diagram of the input/output buffer used on the I2C data line. The pin functionality of the DATA buffer is similar to that of the CLOCK buffer. Also the input and output sections of the DATA buffer are the same as those of the CLOCK buffer. However, the DATA buffer uses only one current source CS1 for controlling the timing parameters of the serial data line when the I2C bus switches in high speed mode and the load on the I2C bus is greater than 100 pf. Current source CS1 is controlled by signal B1 generated from the control logic B of the DATA buffer. Control logic B generates control signal B1 from input signals ENHS, HLOAD and I2COUTEN. Control signal B1 is generated in such a way that it enables current source CS1 only when the I2C bus is in high-speed mode and the load on the I2C bus is greater than 100 pf. In all other states control signal B1 keeps the current source CS1 off.

Figure 5:
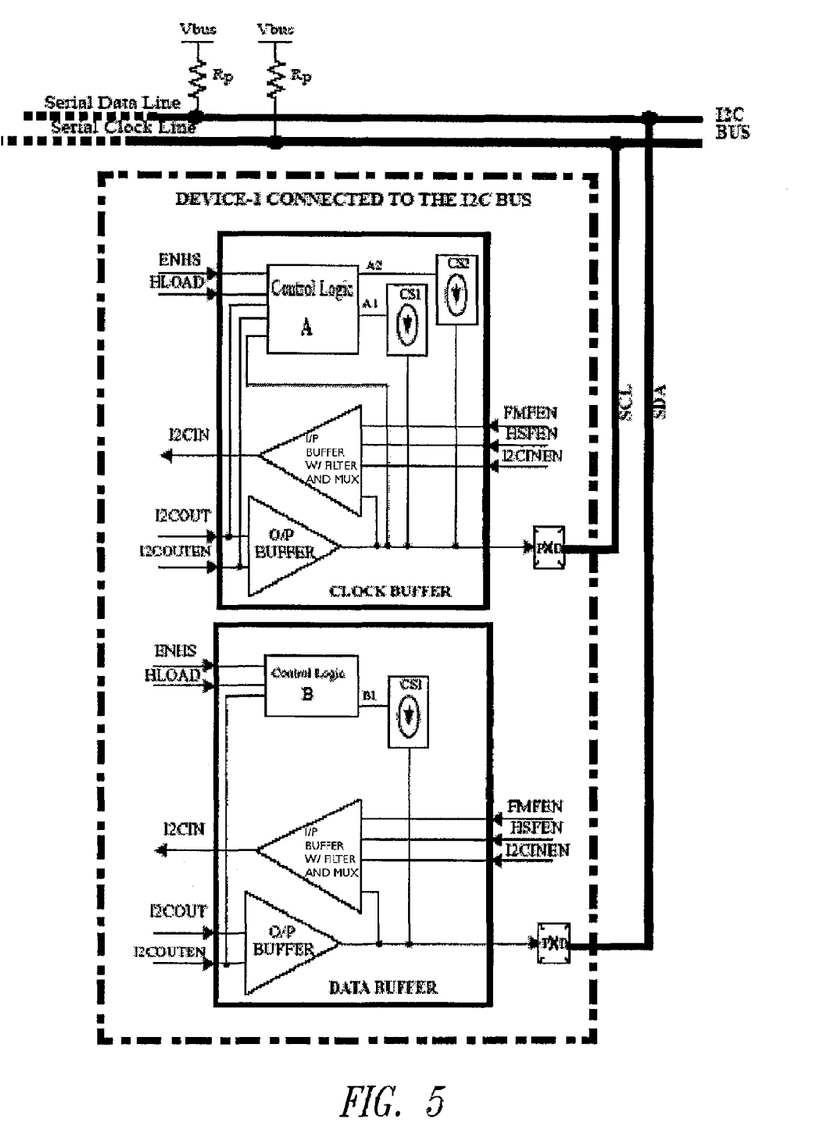
FIG. 5 shows the application of the DATA and CLOCK lines of the I2C bus according to the present disclosure.

FIG. 5 shows the system level application of the DATA and CLOCK buffer. The IO buffers used on the I2C bus are open drain devices, and hence pull-up resistors must be added on both the serial data line and the serial clock line.

Table 1 shows the pin configuration of IO cells for different modes. The pins ENHS, HLOAD, FMFEN and HSFEN are used to switch the I2C buffer from one mode to the other.

TABLE 1

PIN CONFIGURATION FOR DATA AND CLOCK BUFFERS IN DIFFERENT MODE OF I2C.

| ENHS | HLOAD | HSFEN | FMFEN | MODE OF I2C BUS |
|---|---|---|---|---|
| 0 (low) | X | 0 (low) | 0 (low) | STANDARD MODE |
| 0 (low) | X | 0 (low) | 1 (high) | FAST MODE |
| 1 (high) | 0 (low) | 1 (high) | 0 (low) | HS-MODE (Bus load 10 pf to 100 pf) |
| 1 (high) | 1 (high) | 1 (high) | 0 (low) | HS-MODE (Bus load 100 pf to 400 pf) |

Figure 6:
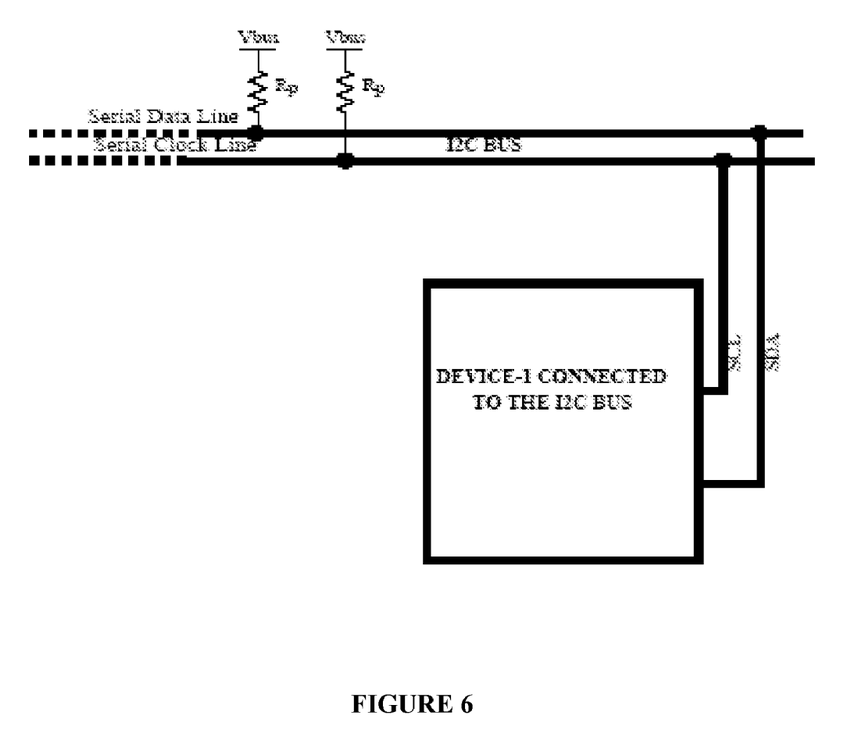
FIG. 6 shows the operation of the I2C system according to the present disclosure, when the I2C bus is in high speed mode and the load on the bus is higher than 100 pf.

FIG. 6 shows the system level architecture of an I2C bus based on the new disclosure. In this architecture, except for two external pull-up resistors, no external component is used on the I2C bus. The IOs used to connect the device on the I2C bus are fully programmable and can be switched from one mode to the other without making any change in the system interconnections. Any variation of load on the I2C bus from 10 pf to 400 pf will also not require any change in components or their interconnections.

Figure 7:
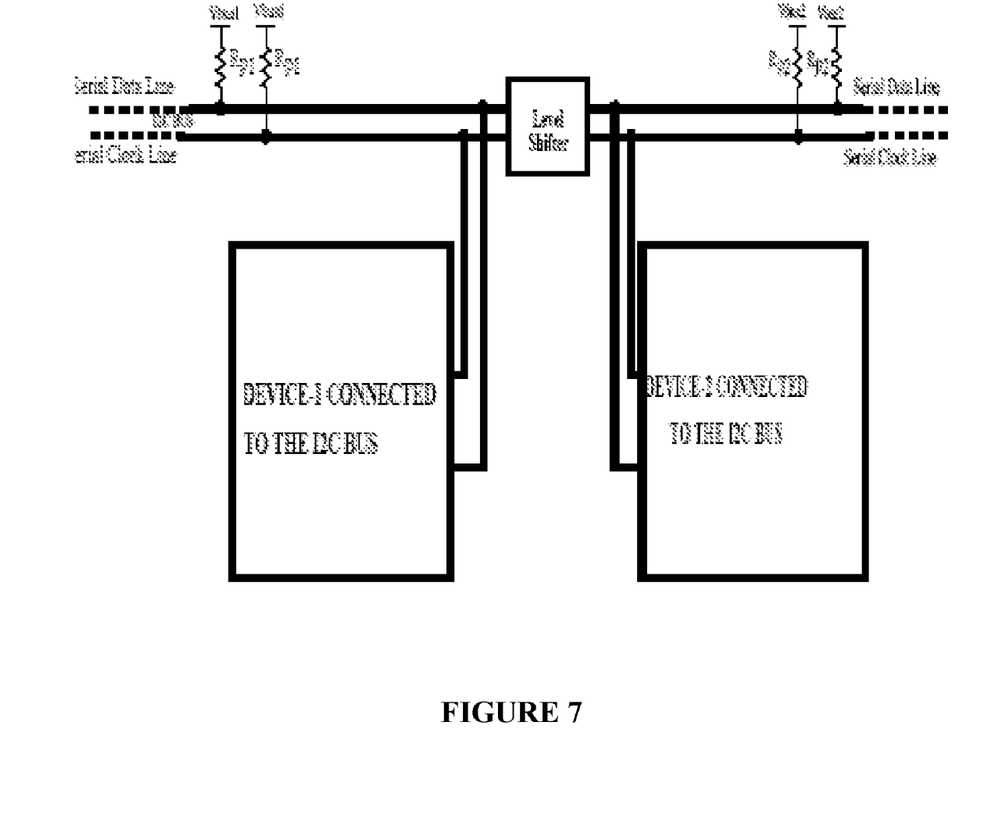
FIG. 7 shows the operation of the I2C system according to the present disclosure, when the I2C bus is in high speed mode and the load on the bus is higher than 100 pf.

FIG. 7 shows the diagram of an I2C system based on the present disclosure using two different bus supply voltages. In this implementation only a level shifter and pull-up resistors are required when the supply voltage of the I2C bus is changed. This simplifies the system level architecture of I2C bus when multiple bus supply voltages are used.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A configurable I2C interface, comprising:
a clock input buffer having selectable input filters for fast and high-speed modes of operation;
a data input buffer having selectable input filters for fast and high-speed modes of operation;
a clock output buffer having a first configurable drive current source;
a data output buffer having a second configurable drive current source;
a first control circuit having a select input and output connected to a control input of said first configurable drive current source; and
a second control circuit having a select input and output connected to a control input of said second configurable drive current source.

2. The configurable I2C interface as claimed in claim 1 wherein said first configurable drive current source comprises a first switchable current source and a second switchable current source.

3. The configurable I2C interface as claimed in claim 2 wherein said first control circuit enables said first switchable current source of the said first configurable drive current source during a rising edge of a clock during high-speed I2C mode.

4. The configurable I2C interface as claimed in claim 2 wherein said first control circuit enables said second switchable current source of the said first configurable drive current source for both a rising edge and falling edge of a clock during high-speed I2C mode when a load capacitance is greater than 100 pf.

5. The configurable I2C interface as claimed in claim 1 wherein said second configurable drive current source comprises a single switchable current source.

6. The configurable I2C interface as claimed in claim 5 wherein said second control circuit enables said switchable current source of the said second configurable drive current source for both a rising edge and falling edge of a serial data line during high-speed I2C mode when a load capacitance is greater than 100 pf.

7. The configurable I2C interface as claimed in claim 1 wherein said selectable input filter include a filter for pulses of less than or equal to 50 nsec width during fast mode of operation.

8. The configurable I2C interface as claimed in claim 1 wherein said selectable input filters include a filter for pulses less than or equal to 10 nsec width during high-speed mode of operation.

9. The configurable I2C interface as claimed in claim 1 further comprising input filters that are selected by means of an input signal multiplexer.

10. A method for improving the performance of an I2C interface comprising the steps of:
providing a clock output buffer with configurable current drive for one of three current levels;
providing a data output buffer with configurable current drive;
sensing a mode of operation;
sensing a value of a capacitive loading on a clock line and a data line; and
selecting the current drive levels of the clock output buffer and the data output buffer based on the desired operating mode as well as the sensed capacitive loading; and
further including the step of filtering the input signals on the data input and clock input buffers.

11. The method for improving the performance of an I2C interface as claimed in claim 10 wherein the three current drive levels for the clock output buffer are configurable by either enabling a first current source having a first current value or enabling a second current having a second current value or enabling both first and second current sources simultaneously.

12. The method for improving the performance of an I2C interface as claimed in claim 10 wherein the current drive for the data output buffer is configurable for one of two current levels.

13. The method for improving the performance of an I2C interface as claimed in claim 10 wherein the filtering comprises the steps of:
enabling a first input filter during fast mode of operation; and
enabling a second input filter during high-speed mode of operation.

14. The method for improving the performance of an I2C interface as claimed in claim 13 wherein the first input filter is configured to filter pulses of width less than or equal to 50 nsec, while said second filter is configured to filter pulses of width less than or equal to 10 nsec.

15. A circuit, comprising:
a clock buffer, comprising an output buffer having an output coupled to an first output node; an input buffer having an output coupled to an I2C bus node and an input coupled to the first output node; a control logic circuit having a first input coupled to the first output node, a second input coupled to a first input of the output buffer and a third input coupled to a second input of the output buffer, a fourth input coupled to a mode control line, a fifth input coupled to a load pin, a first output coupled to a switchable first current source, and a second output coupled to a switchable second current source, each of the first and second current sources having an output coupled to the first output node; and
a data buffer comprising a second output buffer having an output coupled a second output node; a second input buffer having an output coupled to the I2C bus node and an input coupled to the second output node; and a second control logic circuit coupled to a switchable third current source that has an output coupled to the second output node, the second control circuit having a first input coupled to a first input of the second output buffer, a second input coupled to the mode control line, and a third input coupled to the load pin.

16. The circuit of claim 15, wherein the first control logic circuit is configured to enable the first current source when the I2C bus is in high speed mode and a load on the I2C bus is more than 100 pf and simultaneously deactivate the second current source.

17. The circuit of claim 15, wherein the first control logic circuit is configured to disable the first current source and simultaneously enable the second current source only during rising of a serial clock line when the I2C bus is in high speed mode.

18. The circuit of claim 15, wherein the second control logic circuit is configured to enable the third current source only when the I2C bus is in high speed mode and a load on the I2C bus is greater than 100 pf.

19. A configurable I2C interface, comprising:
a clock input buffer;
a data input buffer;
a clock output buffer having a first configurable drive current source comprising a first switchable current source and a second switchable current source;
a data output buffer having a second configurable drive current source;
a first control circuit having a select input and output connected to a control input of said first configurable drive current source;
a second control circuit having a select input and output connected to a control input of said second configurable drive current source; and
wherein the first control circuit enables the second switchable current source of the first configurable drive current source for both a rising edge and falling edge of a clock during high-speed I2C mode when a load capacitance is greater than 100 pf.

20. The configurable I2C interface of claim 19 wherein the second configurable drive current source comprises a single switchable current source.

21. The configurable I2C interface of claim 20 wherein the second control circuit enables the switchable current source of the second configurable drive current source for both a rising edge and falling edge of a serial data line during high-speed I2C mode when a load capacitance is greater than 100 pf.

22. The configurable I2C interface of claim 19 wherein the first control circuit enables the first switchable current source of the first configurable drive current source during a rising edge of a clock during high-speed I2C mode.

* * * * *

UNITED STATES PATENT AND TRADEMARK OFFICE
CERTIFICATE OF CORRECTION

PATENT NO.        : 7,514,962 B2  
APPLICATION NO. : 11/741565  
DATED             : April 7, 2009  
INVENTOR(S)       : Vinod Kumar Page 1 of 1

It is certified that error appears in the above-identified patent and that said Letters Patent is hereby corrected as shown below:

<u>Column 6</u>
Lines 6-7, "wherein said selectable input filters include a filter for pulses less than or equal to 10 nsec width during high-speed mode" should read as -- wherein said selectable input filters include a filter for pulses of less than or equal to 10 nsec width during high-speed mode --

Lines 22-23, "and the data output buffer based on the desired operating mode" should read as -- and the data output buffer based on a desired operating mode --

Lines 24-25, "further including the step of filtering the input signals on the data input and clock input buffers" should read as -- further including the step of filtering input signals on a data input buffer and the clock input buffer --

Line 30, "value or enabling a second current having a second current" should read as -- value or enabling a second current source having a second current --

Line 51, "coupled to an first output node;" should read as -- coupled to a first output node; --

Line 64, "output coupled a second output node;" should read as -- output coupled to a second output node; --

Signed and Sealed this

Eighth Day of September, 2009

David J. Kappos
*Director of the United States Patent and Trademark Office*